Patented Apr. 25, 1933

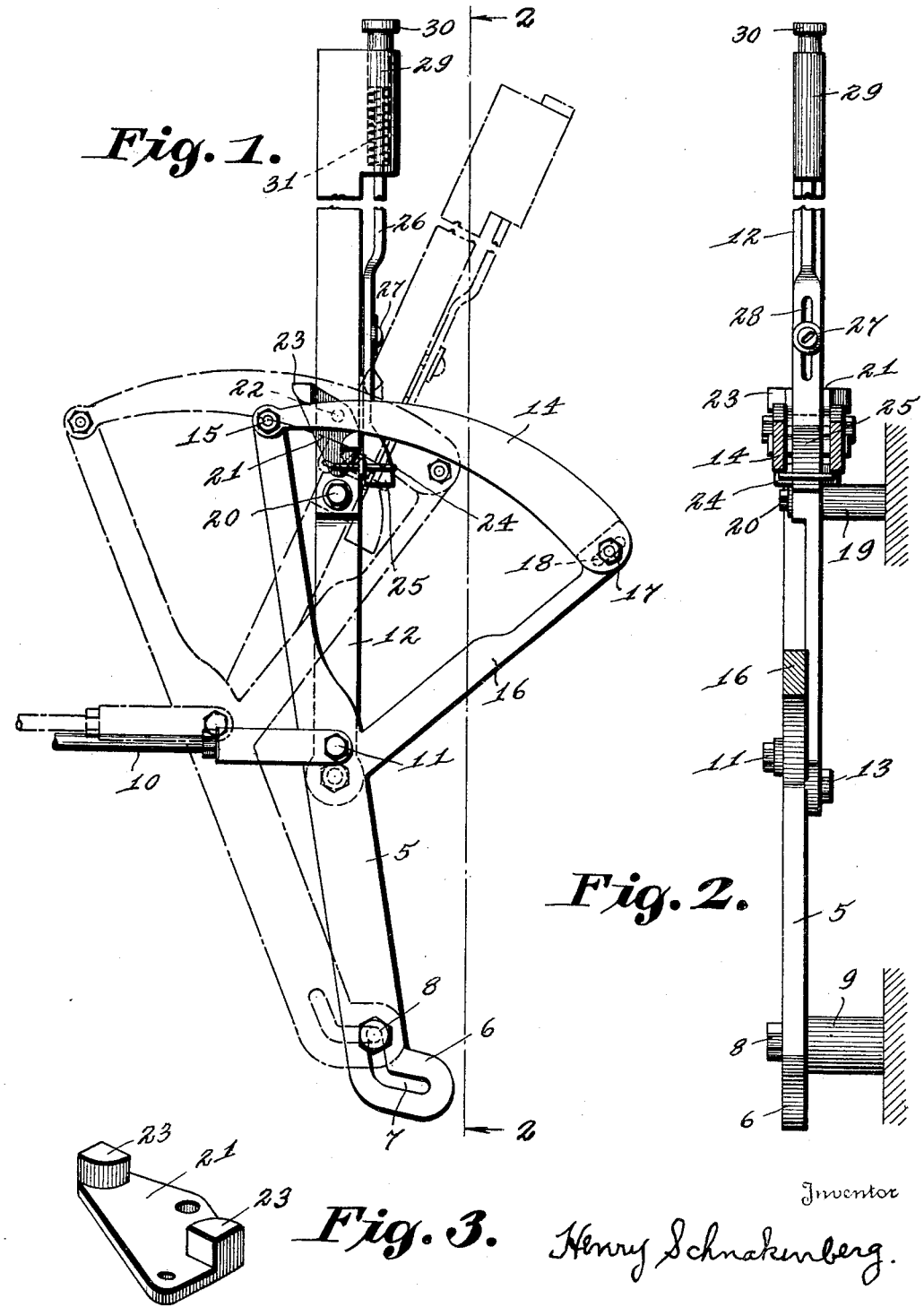

1,905,951

UNITED STATES PATENT OFFICE

HENRY SCHNAKENBERG, OF HONESDALE, PENNSYLVANIA

BRAKE

Application filed June 28, 1932. Serial No. 619,650.

My invention relates to improvements in emergency brake levers for applying the brakes of automobiles.

The primary object of the invention is to provide a brake lever which will permit the brakes to be set and held in any position desired, so that the maximum braking power may be applied to the automobile.

A further object of the invention is to provide a device of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation view of the brake lever, Fig. 2 is a vertical sectional view taken on lines 2—2 of Fig. 1, and, Fig. 3, is a perspective view of the locking dog.

In the drawing, wherein for the purpose of illustration, I have shown a preferred embodiment of my invention, the numeral 5 denotes a lever having an angular shaped lower end 6 provided with an angular slot 7 to receive the screw 8 which loosely and pivotally connects the lower end of the lever to the fixed bearing 9. The lever 5, intermediate its ends is connected to the brake rod 10, by the pivot pin 11 and also has connection with the lower end of the hand lever 12, by the pivot pin 13. A quadrant is attached to one side of the upper end of the lever 5 consisting of a pair of parallel wedge shaped curved arms 14, one end of which are pivotally attached to the upper end of the lever 5, as at 15, and their opposite ends are pivotally attached to the brace rod 16 extending outwardly from the lever 5, by the bolt 17 which is slidable in the slot 18. The hand lever 12 extends upwardly between the curved arms 14 and is pivotally connected to the fixed bearing 19, just below the curved arms, by the bolt 20. A pair of locking dogs 21, as more clearly shown in Fig. 3, are pivotally attached to opposite sides of the hand lever, as at 22, between the arms 14 and at opposite ends are provided with projections or cams 23 adapted to engage the upper and lower edges of the arms to hold the hand lever in its adjusted position. A bail 24 extends from the edge of the hand lever having its arms connected to the lower ends of the locking dogs 21 and disposed within the bail is a wedge 25 connected to the lower end of the release rod 26 which is slidably mounted on the edge of the hand lever by the screw 27 which passes through the longitudinal slot 28 in the rod. The upper end of the release rod extends through the sleeve 29 formed integral with the upper end of the hand lever and a push button 30 is connected to the rod for depressing the rod against the tension of the coil spring 31 within the sleeve which normally urges the rod upwardly.

In operation, the brake lever is released by depressing the release rod 26 which moves the wedge 25 from engagement with the bail 24, thus releasing the locking dogs 21, so that the hand lever 12 is free to move between the arms 14 of the quadrant. Movement of the hand lever 12 on its pivot 20, moves the lever 5 which in turn actuates the brake rod 10 and after the brakes have been applied, the release rod 26 is allowed to assume its normal position, thereby moving the wedge 25 into engagement with the bail 24 which rocks the locking dogs 21, so that the cams 23 frictionally grip the upper and lower edges of the arms 14, thus securely holding the brake lever in its adjusted position. The angular slot 7, in which the pivot screw 8 is loosely mounted, allows the lever 5 to move laterally, when the hand lever 12 has reached the extent of its movement on the quadrant, thereby adding extra presure on the brake rod 10. The arms 14 of the quadrant are wedged shape, so that the locking dogs 21 will more securely grip the arms when the hand lever 12 is moved to apply the brakes. One end of the arms 14 is loosely connected to the brace rod 16, to allow for any slight irregularity in the shape of the arms.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. An emergency brake lever comprising a pivoted lever, a quadrant at the upper end of said lever, a hand lever pivoted intermediate its ends and pivotally connected at its lower end to said first mentioned lever, a locking dog pivotally attached to said hand lever having cams engageable with the upper and lower edges of said quadrant, and releasable means for actuating said locking dogs to move the cams into tight frictional engagement with the edges of said quadrant.

2. An emergency brake lever comprising a pivoted lever, a quadrant at the upper end of said lever having a wedge shape curved arm, a hand lever pivoted intermediate its ends and pivotally connected at its lower end to said first mentioned lever, said lever being movable along the curved arm of said quadrant, a locking dog pivotally attached to said hand lever having cams engageable with the upper and lower edges of the curved arm of said quadrant, a bail connected to the lower end of said locking dog, a wedge movable in said bail for actuating said locking dog to move the cams into tight frictional engagement with the edges of the curved arm, and means for releasing said wedge.

3. An emergency brake lever comprising a pivoted lever, a quadrant at the upper end of said lever having a wedge shape curved arm, a hand lever pivoted intermediate its ends and pivotally connected at its lower end to said first mentioned lever, said lever being movable along the curved arm of said quadrant, a locking dog pivotally attached to said hand lever having cams engageable with the upper and lower edges of the curved arm of said quadrant, a bail connected to the lower end of said locking dog, a wedge movable in said bail for actuating said locking dog to move the cams into tight frictional engagement with the edges of the curved arm, a slidable rod for releasing said wedge, and spring means normally urging said rod upwardly to hold the wedge in engagement with said bail.

In testimony whereof I affix my signature.

HENRY SCHNAKENBERG.